N. GRATZ.
CUSHION TIRED WHEEL.
APPLICATION FILED OCT. 5, 1911.
1,036,829.
Patented Aug. 27, 1912.
2 SHEETS—SHEET 2.
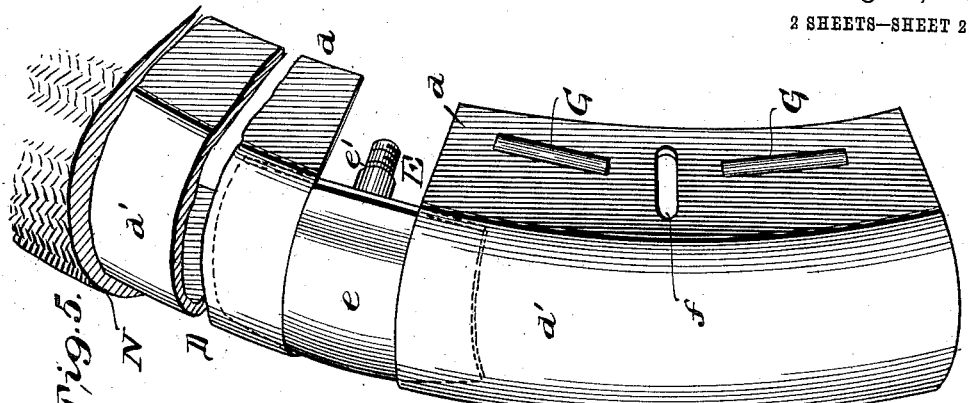
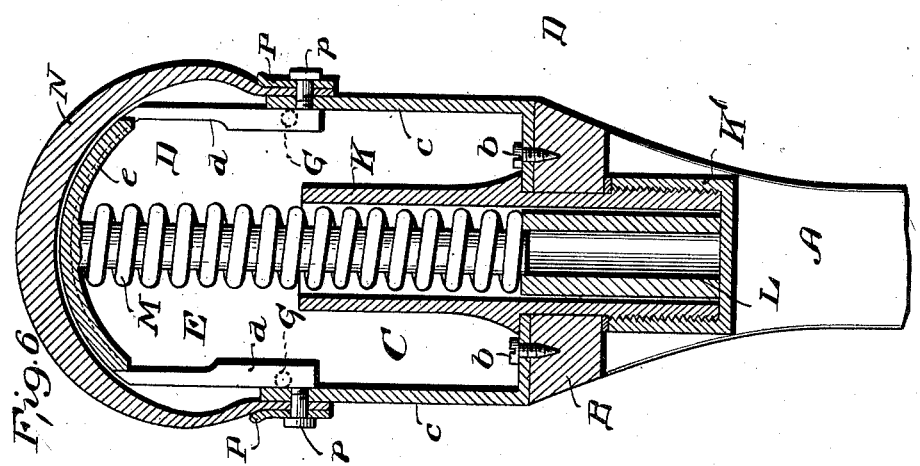
Witnesses
Inventor
Norman Gratz,
By Baldwin Wight
his Attorneys

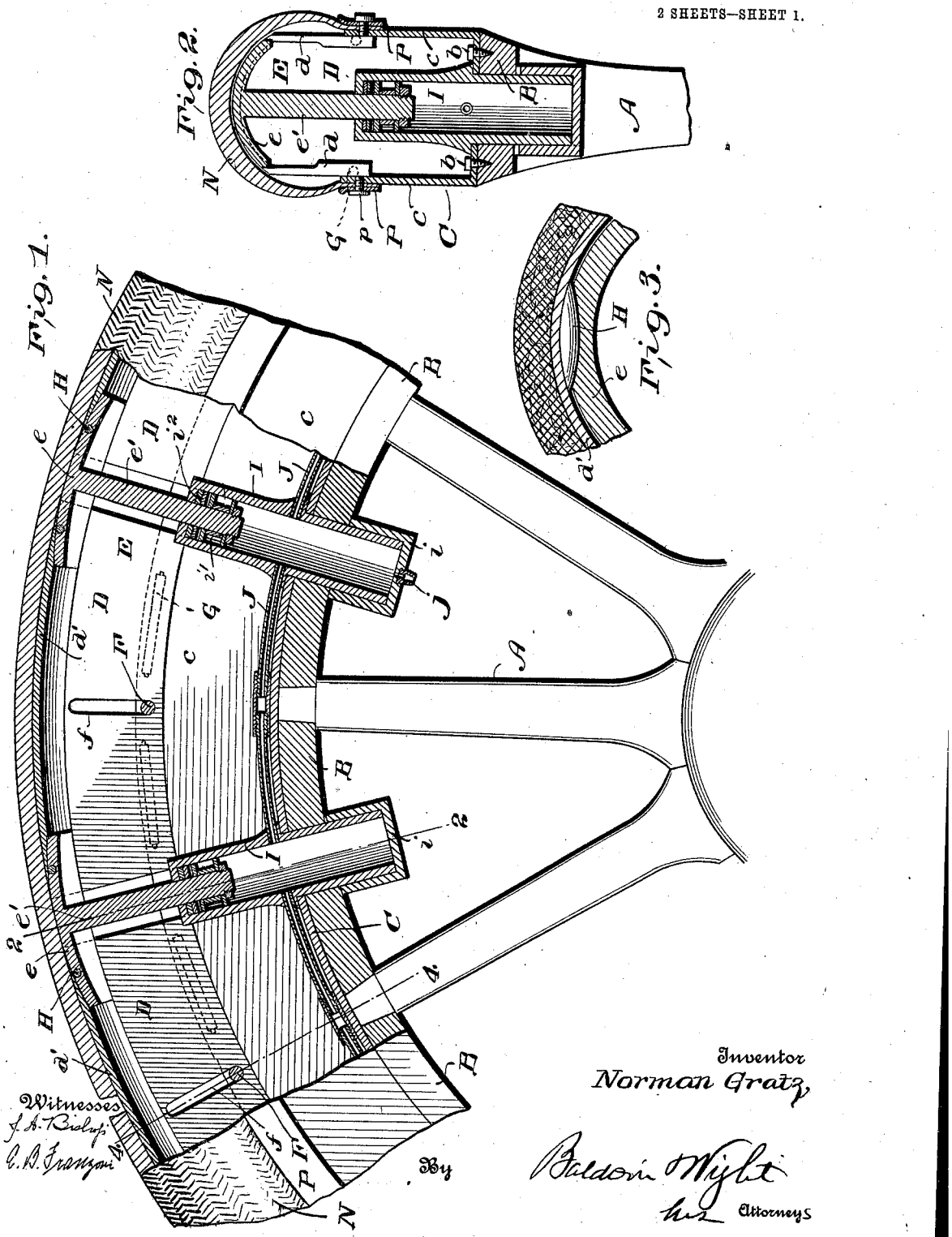

UNITED STATES PATENT OFFICE.

NORMAN GRATZ, OF BOISE, IDAHO.

CUSHION-TIRED WHEEL.

1,036,829. Specification of Letters Patent. Patented Aug. 27, 1912.

Application filed October 5, 1911. Serial No. 652,903.

*To all whom it may concern:*

Be it known that I, NORMAN GRATZ, a citizen of the United States, residing in Boise, in the county of Ada and State of Idaho, have invented certain new and useful Improvements in Cushion-Tired Wheels, of which the following is a specification.

My invention relates to wheels of the class in which provision is made for absorbing shocks or vibrations and increasing the traction of the wheel by means of a tire which is constructed to yield radially as the wheel rotates. Such wheels are commonly employed in automobiles, but are also used on other vehicles. Wheels with pneumatic tires are now almost universally used for this purpose but such tires when punctured or slightly ruptured are rendered inoperative and furthermore are very expensive.

The object of my invention is to provide wheels of this class with novel means for absorbing shocks or vibrations and increasing the traction which are comparatively inexpensive and which are not rendered inoperative by puncture or rupture of the tread portion of the tire.

According to my invention I make the hub, spokes, and felly of the wheel of usual construction and I attach to the felly a trough-shaped rim (which I call the inner rim) which serves as a guide for an outer rim made in segmental sections which are separated from each other, their ends overlapping and being supported by radially movable plungers which are normally pressed outward yieldingly but which are capable of moving radially inward to allow the outer rim sections to move inward to absorb whatever shocks or vibrations may be encountered.

In order to insure the easy movement of the rim sections I interpose anti-friction rollers between the heads of the plungers and the overlapping ends of the rim sections and also between the inwardly projecting flanges of the outer rim sections and the radial flanges of the inner rim.

In order to exclude dirt, water, etc., and to provide a suitable tread, I employ a cover preferably made of rubber and canvas or similar material which incloses the rim sections and is attached to the outer faces of the radial flanges of the inner rim.

Other features of my invention will be hereinafter described.

In the accompanying drawings, Figure 1 is a sectional view of a portion of a vehicle wheel with my improvements applied. Fig. 2 shows a section on the line 2—2 of Fig. 1. Fig. 3 is a detail view in section showing the roller bearing between one of the plungers and an overlapping outer rim section. Fig. 4 shows a section on the line 4—4 of Fig. 1 but on an enlarged scale. Fig. 5 is a perspective view with parts in section and parts broken away showing the relation of some of the parts of the tire. Fig. 6 is a sectional view similar to Fig. 2 but showing a modification.

The spokes A are attached as usual at their outer ends to a felly B and to the periphery of the felly is secured in any suitable way (as by screws $b$) a trough-shaped inner rim C, the radial side flanges $c$ of which serve to confine and guide the radial sides of the outer rim sections. The outer rim is composed of a series of segmental sections D completely surrounding the inner rim. These sections are separated from each other and their end portions are beveled and overlap and rest upon the outer surface of the heads $e$ of the plungers E which are radially arranged and are pressed yieldingly outward. The rim sections D, as clearly shown in Fig. 5, are U-shaped in cross section. The flanges $d$ which are straight and parallel with each other extend inward while the outer part $d'$ is curved longitudinally and transversely. The opposite ends of the heads $e$ of the plungers extend between the flanges $d$ as clearly shown. The flanges $d$ are formed with radial slots $f$ through which extend bolts or rods F secured to the sides $c$ of the inner rim. This construction limits the radial movement of the outer rim sections and also prevents endwise movement thereof. The sides $d$ of the sections D lie close to the flanges $c$ of the inner rim and in order to render the radial movement of the outer rim sections easy I interpose anti-friction rollers G between the flanges $c$ and $d$. I also arrange anti-friction rollers H in the heads of the plungers E. These rollers H are seated in recesses in the heads $e$ of the plungers and bear against the beveled overlapping end portions of the outer rim sections in order that movement of the rim sections endwise on the plungers may be smooth and easy. As shown in Fig. 3 the rollers H are tapered properly to conform to the contour of the portions of the rim sections D which they engage.

As before stated the plungers E are pressed radially outward yieldingly. This may be accomplished in various ways. In the construction shown in Figs. 1 and 2 the inwardly extending shank $e'$ of each plunger passes into a cylinder I set radially on the inner rim and extends through this rim and through the felly being closed at its inner end by a cap $i$. The inner end of the shank $e'$ carries a piston $i'$ of suitable construction and the opening in the outer end of the cylinder I is suitably packed as shown at $i^2$. Each plunger is associated with a cylinder in this way and the several cylinders are connected by pipes J. One of the cylinders is provided with a nipple $j$ to which a pump may be applied to charge all the cylinders with air and press the plungers and the outer rim sections supported thereby outward. Instead of employing compressed air for this purpose, I may employ springs, as shown in Fig. 6. In this case a cylinder K which extends radially through the inner rim and the felly is open at both ends and a short tube section L is arranged in the inner end of the cylinder which latter is closed by a cap K'. A spring M which surrounds the shank $e'$ is interposed between the outer end of the tube section and the inner end of the head of the plunger and serves to press the plunger outward. The inner end of the shank of the plunger extends into the tube section and is guided thereby, and inasmuch as the tube section is loose, the movement of the plunger is made much easier. The tension of the spring may be regulated by the cap K'.

In order to press the outer rim sections upon the plungers to exclude dust, water, etc., and to provide a suitable tread for the wheel, I inclose the rim sections and the outer portions of the plungers by a cover N preferably made of rubber and canvas. This covering is attached to the outer faces of the side flanges $c$ of the inner rim by rings P and screws $p$, or in any other suitable way.

By my improvements I provide a wheel with a cushion tire which will operate quite as efficiently as the ordinary pneumatic tire without the objections incident to such a tire. Shocks and vibrations are satisfactorily absorbed, noises eliminated and a good tread is afforded. Punctures or slight ruptures in no way interfere with the action of the covering device and the cost of manufacture is much less than that of the commonly used pneumatic tire.

I claim as my invention:

1. A cushion tired wheel, comprising an inner rim, a series of independently movable outer rim sections curved longitudinally and transversely and having beveled ends, radially movable plungers pressed outward yieldingly and having on their outer ends heads curved longitudinally and transversely and the outer faces of which are overlapped by the beveled ends of the rim sections which rest on said heads and are movable circumferentially relatively thereto, and anti-friction rollers tapered in opposite directions and seated in said heads on which the ends of the rim sections rest.

2. A cushion tired wheel, comprising an inner rim having outwardly extending side flanges, a series of outer rim sections which are curved longitudinally and transversely, have spaces between their ends and have side flanges extending inward between the flanges of the inner rim, a cover inclosing said rim sections, and radially movable plungers yieldingly supported by the inner rim and having heads curved longitudinally and transversely and which are pressed outward radially through said spaces against the cover and which are movable radially inward without moving said outer rim sections, the outer faces of said heads next the cover being overlapped by the ends of the rim sections which rest on the outer faces of said heads and are movable circumferentially thereon.

3. A cushion tired wheel, comprising an inner rim, a series of outer rim sections which are curved longitudinally and transversely and have beveled ends with spaces between them, a cover inclosing said rim sections and radially movable plungers having heads curved longitudinally and transversely and which are pressed yieldingly outward radially through said spaces against the cover and which fill said spaces, the outer faces of said heads next the cover being overlapped by the beveled ends of the rim sections which rest on said heads are movable circumferentially thereon and with said heads form an unbroken curved surface next the cover.

In testimony whereof, I have hereunto subscribed my name.

NORMAN GRATZ.

Witnesses:
M. L. HART,
M. T. DOUGLASS.

Copies of this patent may be obtained for five cents each, by addressing the "Commissioner of Patents, Washington, D. C."